United States Patent
Zheng et al.

(10) Patent No.: US 11,254,345 B2
(45) Date of Patent: Feb. 22, 2022

(54) SECURING STEERING WHEEL IN STEER-BY-WIRE SYSTEMS

(71) Applicant: STEERING SOLUTIONS IP HOLDING CORPORATION, Saginaw, MI (US)

(72) Inventors: Kai Zheng, Midland, MI (US); Hemant K. Sharma, Saginaw, MI (US); Xingye Zhang, Saginaw, MI (US); Mariam Swetha George, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 305 days.

(21) Appl. No.: 16/260,508

(22) Filed: Jan. 29, 2019

(65) Prior Publication Data

US 2020/0239061 A1    Jul. 30, 2020

(51) Int. Cl.
| | |
|---|---|
| *B62D 1/181* | (2006.01) |
| *B62D 5/04* | (2006.01) |
| *B62D 1/183* | (2006.01) |
| *B62D 15/02* | (2006.01) |
| *B62D 1/04* | (2006.01) |
| *B62D 5/00* | (2006.01) |

(52) U.S. Cl.
CPC ............ *B62D 1/181* (2013.01); *B62D 5/046* (2013.01); *B62D 1/04* (2013.01); *B62D 1/183* (2013.01); *B62D 5/005* (2013.01); *B62D 15/021* (2013.01)

(58) Field of Classification Search
CPC .......... B62D 1/16; B62D 1/181; B62D 5/046; B62D 1/183; B62D 15/021; B62D 1/04; B62D 5/005; B62D 6/008; B62D 5/006; B62D 5/0463; B62D 5/0466; G05D 16/103; Y10T 74/20834
See application file for complete search history.

(56) References Cited

U.S. PATENT DOCUMENTS

| | | | | |
|---|---|---|---|---|
| 2008/0116834 | A1* | 5/2008 | Namuduri | B62D 5/046 318/610 |
| 2008/0306654 | A1* | 12/2008 | Katrak | B62D 5/008 701/41 |
| 2016/0244089 | A1* | 8/2016 | Scotson | B62D 5/0487 |

FOREIGN PATENT DOCUMENTS

| | | |
|---|---|---|
| CN | 103921841 A | 7/2014 |
| CN | 105416395 A | 3/2016 |
| CN | 108100030 A | 6/2018 |

(Continued)

OTHER PUBLICATIONS

Search Report regarding corresponding CN App. No. 2020100789889; dated Nov. 22, 2021.

*Primary Examiner* — Nga X Nguyen
(74) *Attorney, Agent, or Firm* — Dickinson Wright PLLC (57) ABSTRACT

According to one or more embodiments, a steer by wire steering system includes a handwheel, and a handwheel actuator configured to secure a position of the handwheel. The securing includes determining a transition of the steer by wire steering system to an ingress/egress mode. The securing further includes, based on the determination that the steer by wire steering system is in the ingress/egress mode, computing a holding torque command based on a difference in a present angle of the handwheel and a target angle of the handwheel, which is caused by an input torque. Further, the securing includes generating a holding torque corresponding to the holding torque command to secure the position of the handwheel.

20 Claims, 6 Drawing Sheets

(56) References Cited

FOREIGN PATENT DOCUMENTS

| CN | 108602529 A | 9/2018 |
|---|---|---|
| EP | 1905670 A2 | 4/2008 |
| EP | 2774829 A1 | 9/2014 |

\* cited by examiner

SECURING STEERING WHEEL IN STEER-BY-WIRE SYSTEMS

BACKGROUND

An electric power steering (EPS) typically includes components such as steering wheel, column, rack-pinion gear, electric motor actuator etc. The EPS helps the operator to steer a vehicle by providing necessary torque assist. The assist torque is based on operator's applied torque. In a steady-state sense, the operator torque and assist torque counter the rack force generated because of tire-road interaction.

A typical Steer by wire (SbW) system includes a road-wheel actuator (RWA) unit and handwheel (or steering wheel) actuator (HWA) unit. Unlike the EPS, the two units in the SbW are mechanically disconnected (no mechanical connection) and communicate through controlled area network (CAN) interface (or other similar digital communication protocols). The HWA unit receives a rack force signal from the RWA unit to generate an appropriate torque feel for the operator. Alternatively, the handwheel angle and vehicle speed can also be used to generate desired torque feel to the operator. The angle from HWA unit is sent to the RWA unit which performs position control to control rack travel.

SUMMARY

According to one or more embodiments, a steer by wire steering system includes a handwheel, and a handwheel actuator configured to secure a position of the handwheel. The securing includes determining a transition of the steer by wire steering system to an ingress/egress mode. The securing further includes, based on the determination that the steer by wire steering system is in the ingress/egress mode, computing a holding torque command based on a difference in a present angle of the handwheel and a target angle of the handwheel, which is caused by an input torque. Further, the securing includes generating a holding torque corresponding to the holding torque command to secure the position of the handwheel.

According to one or more embodiments, a method for securing a position of a handwheel of a steer by wire steering system includes determining a transition of the steer by wire steering system to an ingress/egress mode. The method further includes, based on the determination that the steer by wire steering system is in the ingress/egress mode, computing a holding torque command based on a difference in a present angle of the handwheel and a target angle of the handwheel, which is caused by an input torque. Further, the method includes generating a holding torque corresponding to the holding torque command to secure the position of the handwheel.

According to one or more embodiments, a computer program product includes a memory device having computer executable instructions stored therein, the computer executable instructions when executed by a processor causes the processor to perform a method for securing a position of a handwheel of a steer by wire steering system. The method includes determining a transition of the steer by wire steering system to an ingress/egress mode. The method further includes, based on the determination that the steer by wire steering system is in the ingress/egress mode, computing a holding torque command based on a difference in a present angle of the handwheel and a target angle of the handwheel, which is caused by an input torque. Further, the method includes generating a holding torque corresponding to the holding torque command to secure the position of the handwheel.

These and other advantages and features will become more apparent from the following description taken in conjunction with the drawings.

DETAILED DESCRIPTION

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

The present application is generally related to steering systems, and particularly describes one or more techniques for securing a steering wheel or handwheel using actuators in steer by wire type steering systems. The technical solutions herein operate without relying on mechanical connections, which are present in the typical steering systems to connect the handwheel with the rack. For example, in electric power steering (EPS) system, the steering wheel in drivers' hands is mechanically connected with column, column is mechanically connected (via intermediate shafts and universal joints) with the rack, and rack is mechanically connected with road wheels.

The steering system helps the operator to steer a vehicle by providing necessary torque assist. Today, a modern steering system typically includes components such as steering wheel, column, rack-pinion gear, electric motor actuator etc. The assist torque is based on operator's applied torque. In a steady-state sense, the operator torque and assist torque counter the rack force generated because of tire-road interaction.

Figure 1:
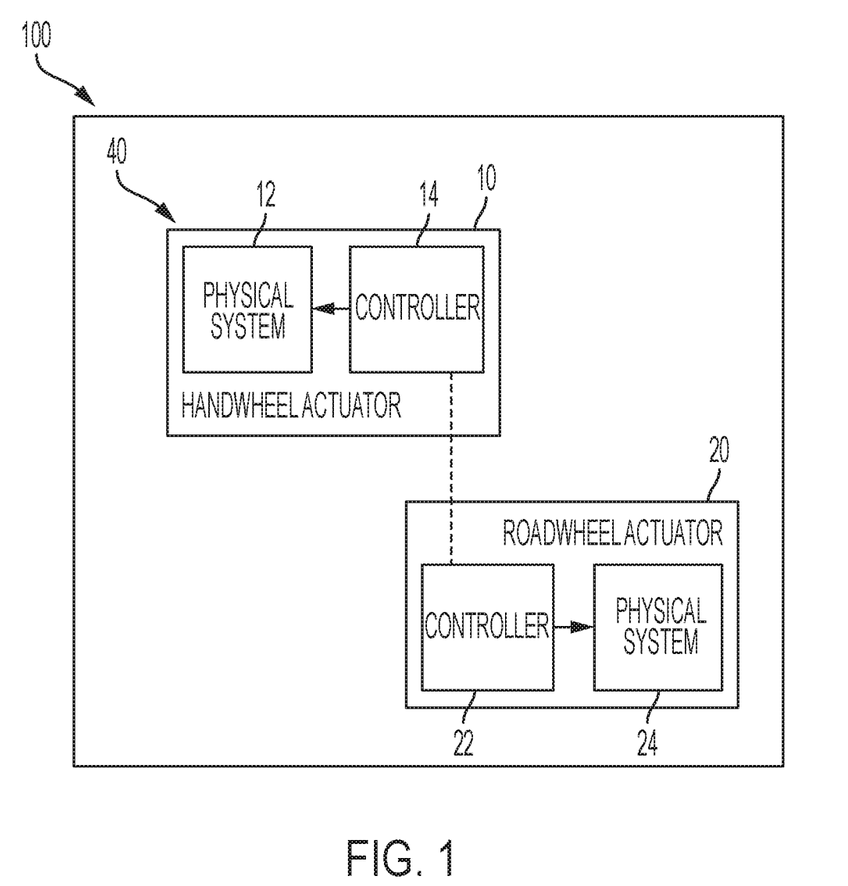
FIG. 1 is an exemplary embodiment of a steer by wire steering system according to one or more embodiments.

Referring now to the Figures, where the invention will be described with reference to specific embodiments, without limiting same, a steer by wire steering (SbW) system 40 in a vehicle 100 is depicted in FIG. 1. It will be appreciated that the SbW system 40 shown and described can be used in an autonomous or semi-autonomous vehicle or in a more conventional vehicle. The SbW system 40 includes a handwheel actuator (HWA) 10 and a roadwheel actuator (RWA) 20.

The HWA 10 includes one or more mechanical components 12, such as a motor/inverter attached to a steering column and a handwheel (steering wheel), either through a gear mechanism or a direct drive system. The HWA 10 further includes a microcontroller 14 that controls the operation of the mechanical components 12. The microcontroller 14 receives and/or generates torque via the one or more mechanical components 12.

The RWA includes one or more mechanical components 24, such as a steering rack and/or pinion coupled to a motor/inverter through a ball-nut/ball-screw (gear) arrangement, and the rack is connected to the vehicle roadwheels/tires through tie-rods. The RWA 20 includes a microcontroller 22 that controls the operation of the mechanical components 24. The microcontroller 22 receives and/or generates torque via the one or more mechanical components 24.

The microcontrollers 14 and 22 are coupled through electrical connections that allow signals to be transmitted/received. As referred to herein, a controller can include a combination of the HWA controller 14 and the RWA controller 22, or any one of the specific microcontrollers.

In one or more examples, the controllers 12 and 22 SbW system 40 communicate with each other through CAN interface (or other similar digital communication protocols). Guidance of the vehicle 100 that is fitted with the SbW system 40 is performed by use of the steering gear, with an input shaft that is rotated by the RWA 20, such as a servo actuator. The RWA 20 receives an electronic communication signal of rotation of the steering wheel by the operator. An operator controls the steering wheel to directionally control the vehicle 100. The angle from HWA 10 is sent to the RWA 20 which performs position control to control rack travel to guide the roadwheel. However, due to the lack of mechanical connection between the steering wheel and the road wheels, the operator is not provided with a feel for the road without torque feedback (unlike the case in an EPS as described earlier).

In one or more examples, the HWA 10 that is coupled to the steering column and steering wheel simulates the operator's feel of the road. The HWA 10 may apply tactile feedback in the form of torque to the steering wheel. The HWA 10 receives a rack force signal from the RWA 20 to generate an appropriate torque feel for the operator. Alternatively, the handwheel angle and vehicle speed can also be used to generate desired torque feel to the operator.

Consider the case that a user, such as the operator, opens a vehicle door and goes into the vehicle 100, grabs the steering wheel either on purpose or unintentionally, before igniting the engine. In this scenario, in a steering system with mechanical connections, the clutch is engaged so that the driver can feel the rack load on the steering wheel because of the mechanical connection between column and rack. Also, the rack load passed through steering wheel can prevent the rotation of steering wheel if some torque is applied on it by the user unintentionally. However, without the mechanical connections such as clutch and intermediate shaft, and particularly when the vehicle is in the off state, such a rack load is not experienced by the user in case of the SbW system 40.

The technical solutions described herein address such technical challenges and provide a technique for securing the handwheel in case of SbW systems 40. The securing facilitates, under certain conditions (e.g. engine is off, vehicle speed is 0 kph, and a user has the intention to step in/out of the vehicle 100 using the handwheel for support), the SbW system 40 to hold the handwheel angle substantially at a predetermined angle so that the handwheel can provide some support to the user or reject some unintentional torque from the user.

In this scenario, the HWA 10 has to hold the handwheel at the predetermined angle and secure that position. It should be noted that this is different from a typical operation of the SbW system 40 where the HWA 10 provides desired steering feel to the user when the handwheel is moved. This particular mode can be referred to as Ingress/Egress mode where the user is trying to use the handwheel to step in/out of the vehicle 100. In particular, Ingress indicates the duration between the user opening the vehicle door and igniting the engine (or whenever the vehicle is ready to be driven), and Egress indicates the duration between the user shutting down the engine (or whenever the vehicle is not ready to be driven) and leaving the vehicle 100.

When the vehicle door is open, especially the vehicle door on the steering-side, the vehicle speed is 0 kph, and when the engine is off, the HWA 10 switches into the Ingress mode. When driver starts the ignition, a corresponding signal is received by the SbW system 40. For example, a battery on-off signal in case electric or hybrid vehicle, or any other type of signal indicative of the engine ignited can be received by the SbW system 40. Upon receipt of such a signal, the HWA 10 switches from Ingress/Egress mode to SbW operative mode, in which the SbW system 40 operates to provide steering feel according to the rack position, as described earlier.

When the user shuts down the ignition, the HWA 10 goes into the Egress mode. In this case, the SbW system 40 receives a signal indicative of the engine shut down. Further, the SbW system 40 receives a signal indicative of the user stepping out of the vehicle 100, for example a signal indicating that the vehicle door is locked. Upon receiving such a signal, the HWA 10 and RWA 20 shut down, and effectively the SbW system 40 shuts down.

Figure 2:
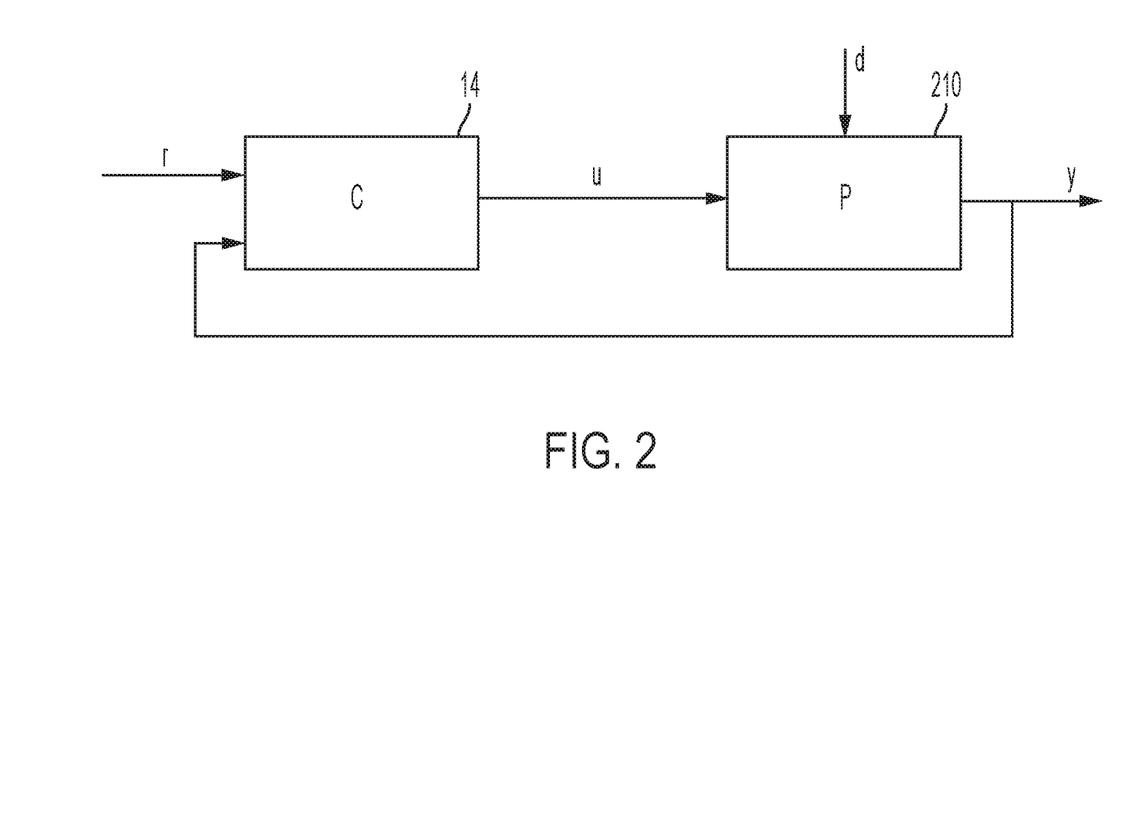
FIG. 2 depicts a block diagram for operation of the SbW system in the Ingress/Egress mode according to one or more embodiments.

FIG. 2 depicts a block diagram for operation of the SbW system in the Ingress/Egress mode according to one or more embodiments. In Ingress/Egress mode, the HWA 10 provides a motor torque command so that the handwheel angle can be secured at the predetermined angle even when different disturbance torques are applied by the user. The technical challenge is depicted as an angle control problem, where r is a target column angle, y is the actual column angle, d is the torque applied on steering wheel by the user, u is the motor torque command generated by the HWA 10, C is the controller 14, and P is an operative model 210 of the column dynamic system.

The controller 14 is configured to provide a non-linear response so as to provide a maximum motor torque to lock the steering wheel, and to slow down the transient response of free motion. Consider e=r−y is the angle error between target column angle and measured column angle. A saturation function (sat( )) is used by the controller 14 where:

sat(x)=x, when −a<=x<=a;
sat(x)=a, when x>a; and
sat(x)=−a, when x<−a, where a>0, and a is a predetermined saturation limit.

Further, the controller 14 uses a derivative function (dot( )) with respect to time so that dot(x) is the derivative of x with respect to time. The controller 14 further uses a filter (fil( )) on the input signal, which can be a low pass filter or an anti-notch filter. Using the above functions, the controller 14 perform in a nonlinear manner and as a saturated proportional controller plus a damping controller, where:

$$u = sat(Kp*e) - fil(dot(y)*Kd) \quad (1),$$

where Kp is the coefficient of the proportional controller and Kd is the coefficient in the damping controller.

The filter fil( ) in damping controller facilitates the closed-loop system stability. Due to different dynamic behavior of column design, a low pass filter is used for column EPS and anti-notch filter for concentric motor with torque bar. The saturation sat( ) on proportional controller determines a (slow) constant velocity transient response, where the desired velocity (v) in transient response is determined by:

$$v = a/Kd \quad (2).$$

When a user steers the handwheel away from target angle and lets it go, the driver torque is 0. Here, the system friction is small, or approximately 0. The net torque on the column is the summation of driver torque, motor torque, and system friction. When dot(y)=v, from Equations (1) and (2) it can be seen that u is substantially 0. Therefore, the net torque is substantially 0, and hence the column can return to target angle in substantially a constant velocity v.

Figure 3:
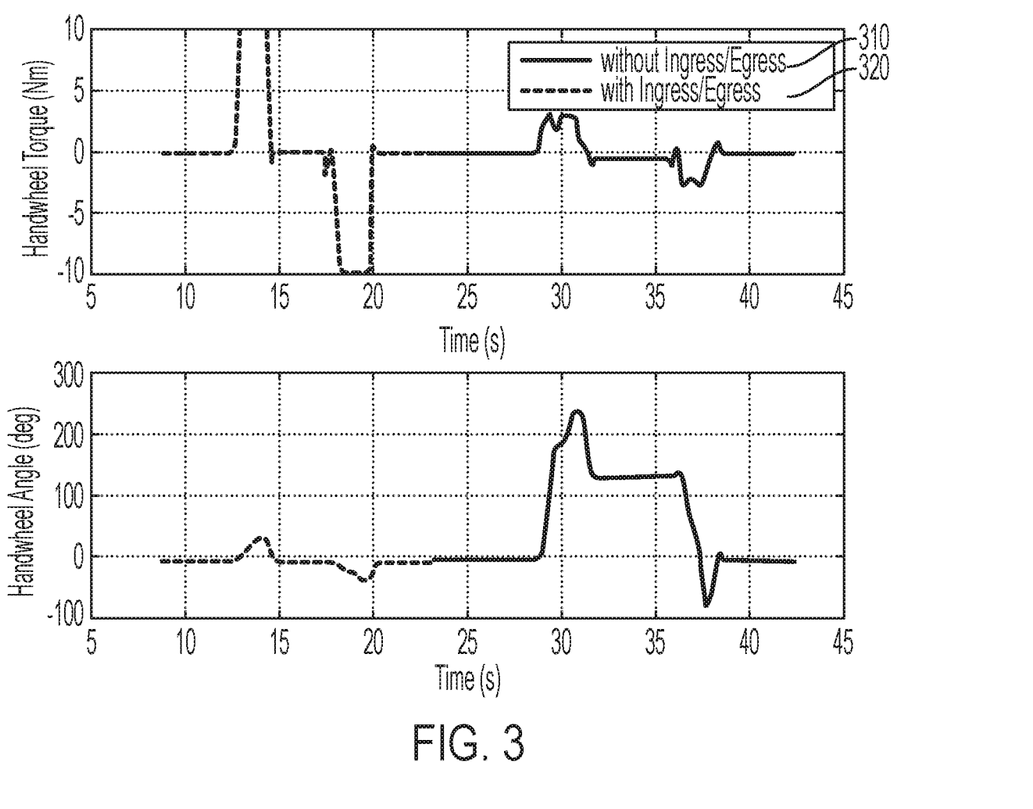
FIG. 3 shows a comparison between scenarios with and without the Ingress/Egress mode according to one or more embodiments.

FIG. 3 shows a comparison between scenarios with and without the Ingress/Egress mode according to one or more embodiments. With Ingress/Egress (320), even though the handwheel torque is large, the handwheel angle does not change substantially, that is the handwheel is locked/secured, because in the Ingress/Egress mode the additional torque (u) is generated by the HWA 10 to secure the handwheel. However, without Ingress/Egress (310), even a small driver torque applied to the handwheel can cause the handwheel to move more, proportional to the applied torque, in comparison to that with Ingress/Egress mode (320).

Figure 4:
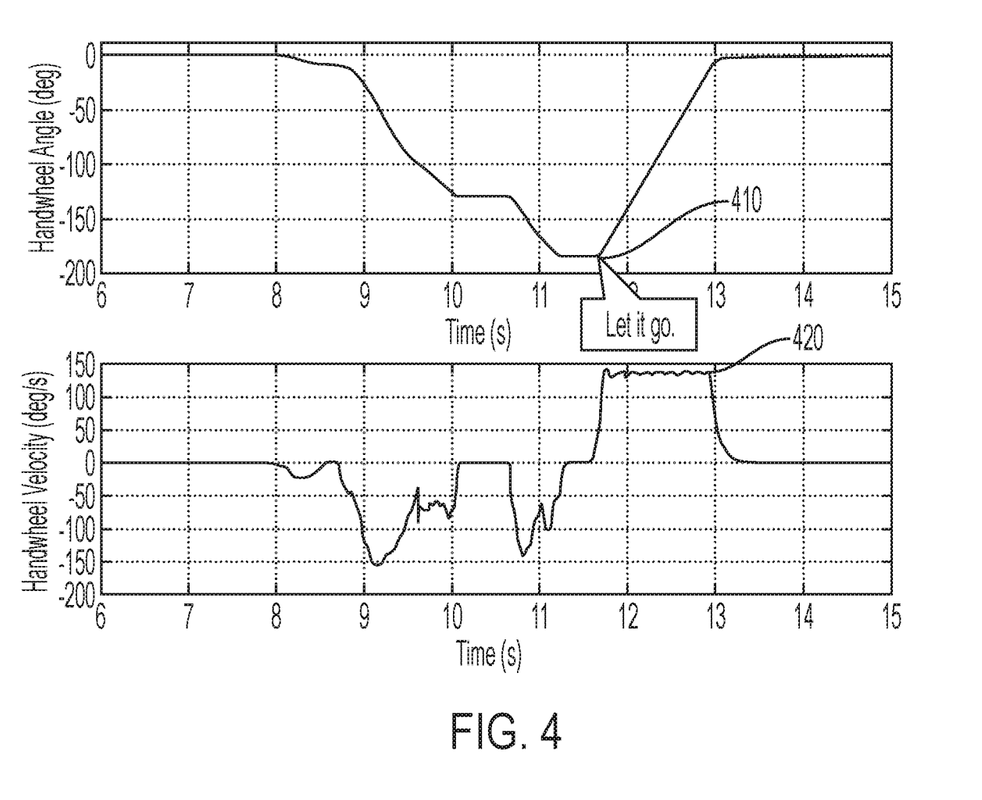
FIG. 4 depicts a slow return to target angle at constant velocity achieved in the Ingress/Egress mode according to one or more embodiments.

FIG. 4 depicts a slow return to target angle at constant velocity achieved in the Ingress/Egress mode according to one or more embodiments. Using the Ingress/Egress function can achieve slow return to target angle at constant velocity (v) (420), once the user steers the handwheel and lets it go (410), the constant velocity (420) computed as described herein.

Further, as described herein, during a typical operation of the SbW system, when not in Ingress/Egress mode, the RWA 20 generates a motor torque so that the rack position follows the corresponding column angle caused by a change in the handwheel position. However, such a change in the rack position consumes energy. Particularly, when the engine of the vehicle 100 is off, the energy consumed is from a vehicle battery (not shown) and hence, in the Ingress/Egress mode, the RWA 20 is facilitated to maintain the rack position, accordingly conserving energy.

Figure 5:
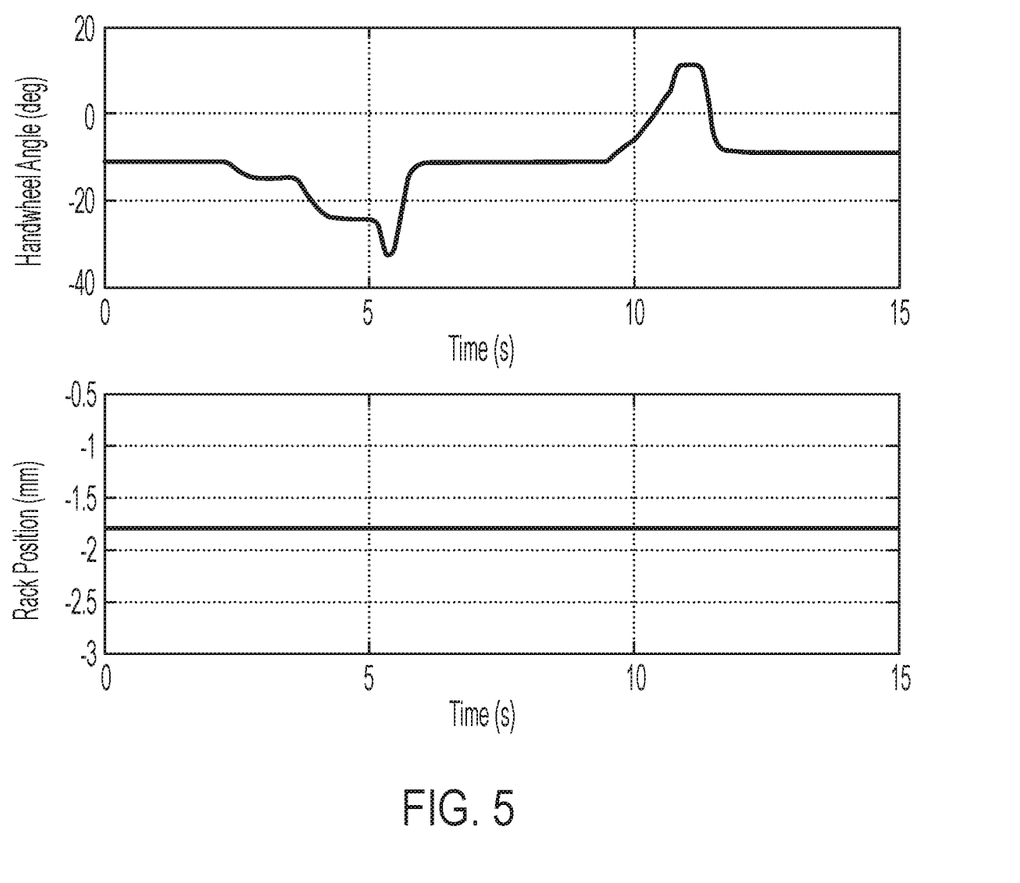
FIG. 5 depicts a graph depicting that rack position is not changed in Ingress/Egress mode according to one or more embodiments.

To this end, the RWA 20 is configured so that the rack position follows the corresponding target column angle, while the actual column angle can still move around target angle in the Ingress/Egress mode. Accordingly, as depicted in FIG. 5, in the Ingress/Egress mode, the rack position does not change despite a change in the handwheel position according to one or more embodiments. In other cases, the rack position is allowed to change corresponding to the change in the handwheel position in the Ingress/Egress mode.

Figure 6:
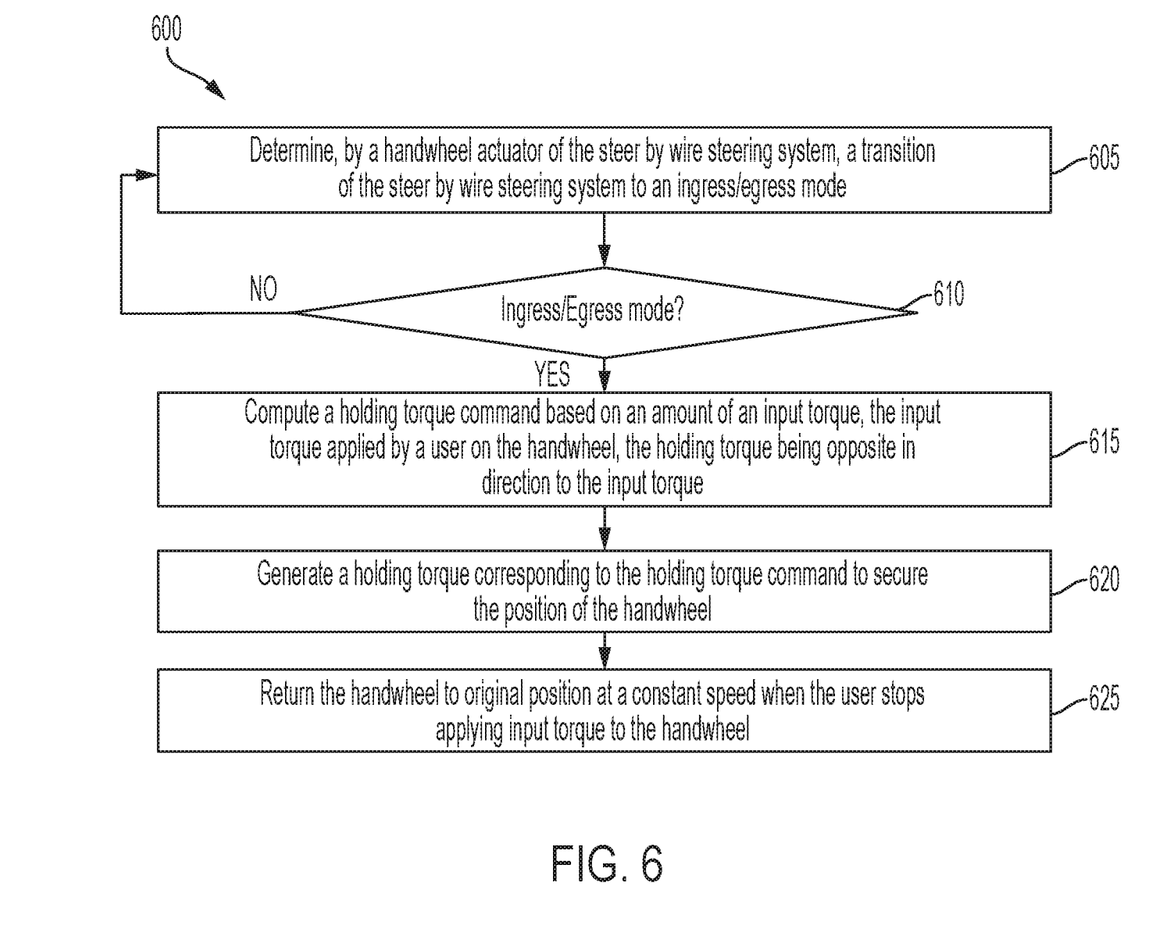
FIG. 6 depicts a flowchart of an example method for securing a steering wheel of SbW system according to one or more embodiments.

FIG. 6 depicts a flowchart of an example method for securing a steering wheel of SbW system according to one or more embodiments. The depicted method 600 can be executed by the one or more controllers of the HWA 10 and/or RWA 20. The method 600 includes determining, by the HWA 10, a transition of the SbW system 40 to an ingress/egress mode, at 605. The transition can be detected based on one or more signals. For example, the transition to the ingress/egress mode, in one or more examples, is based on a signal indicative that an engine of the vehicle 100 is switched off. Alternatively, or in addition, the transition to the ingress/egress mode is based on a signal indicative that a vehicle-door is open and the engine is switched off. The signals can be received from one or more electronic control units (ECUs) responsible for those functions in the vehicle 100.

If the SbW system 40 is not in the ingress/egress mode, the HWA 10 and the RWA 20 continue operating as in typical cases as described herein, at 610. For example, the HWA 10 generates a torque for the operator to have a steering-feeling corresponding to a rack load detected by the RWA 20. Additionally, the RWA 20 adjusts the roadwheel position (i.e. rack position) based on an input torque from the operator on the handwheel.

If the SbW system 40 is in the ingress/egress mode, the HWA 10 computes a holding torque command based on an amount of an input torque, at 615. The input torque is applied by a user on the handwheel. The holding torque that is generated is opposite in direction to the input torque. The HWA 10 computes the holding torque in a nonlinear manner using equation (1) described herein, based on a difference in the present position of the handwheel and a target position of the handwheel based on the input torque. In one or more examples, the holding torque is generated by generating a motor torque command that is applied to a motor of the physical system 12 by the controller 14 of the HWA 10, at 620. The holding torque that is generated is limited to a predetermined maximum. By opposing the input torque on the handwheel by generating the holding torque, the position of the handwheel is not allowed to change beyond a particular limit, thus substantially securing the position of the handwheel.

Further yet, the handwheel is returned to the original position when the input torque is applied to the handwheel when the user lets go of the handwheel, that is when the user stops applying further input torque to the handwheel, at 625. In other words, when the input torque becomes 0, the handwheel is returned to the original position. The return is performed at a constant speed. In one or more examples, the constant speed (v) is predetermined. Alternatively, or in addition, the constant speed (v) is based on the coefficient Kd of the PID controller 14.

The technical solutions described herein accordingly facilitate a SbW system to dynamically generating a torque in a non-linear manner using a HWA to secure the handwheel when an input torque is applied to the handwheel when the SbW system is switched off, such as when the vehicle is switched off. The technical solutions improve the operation of the steering system by preventing the steering system from actuating the handwheel during ingress/egress into/from the vehicle. The method of computing the holding torque is such that the holding torque command opposes the input torque and returns the handwheel to a target angle at a constant velocity in the event that the input torque vanishes after handwheel moves to a different position due to the input torque.

While the technical solutions are described in detail in connection with only a limited number of embodiments, it should be readily understood that the technical solutions are

Having thus described the invention, it is claimed:

1. A steer by wire steering system for a vehicle, comprising:
   a handwheel; and
   a handwheel actuator configured to secure a position of the handwheel, the handwheel actuator including a motor and an electronic controller, the electronic controller configured to:
      determine a transition of the steer by wire steering system to an ingress/egress mode corresponding to a time duration between a user opening a door of the vehicle and when the vehicle is ready to be driven or a time duration between the user shutting down a propulsion system of the vehicle and the user leaving the vehicle; and
      based on the determination that the steer by wire steering system is in the ingress/egress mode:
         compute a holding torque command based on a difference in a present angle of the handwheel and a target angle of the handwheel, which is caused by an input torque; and
         apply the holding torque command to cause the motor to generate a holding torque opposing the input torque and to secure the position of the handwheel.

2. The steer by wire steering system of claim 1, wherein the transition to the ingress/egress mode is based on a signal indicative that a vehicle-engine is switched off.

3. The steer by wire steering system of claim 1, wherein the transition out of the ingress/egress mode is based on a signal indicative that a vehicle-engine is switched on.

4. The steer by wire steering system of claim 1, wherein, the holding torque is limited to a predetermined maximum amount.

5. The steer by wire steering system of claim 1, wherein the handwheel actuator is further configured to return the handwheel to an original position at a constant velocity in case the handwheel moves to a different position because of the input torque.

6. The steer by wire steering system of claim 1, wherein the holding torque command is computed based on a difference in a present angle of the handwheel and a target angle of the handwheel, which is caused by the input torque.

7. The steer by wire steering system of claim 1, wherein the steer by wire system further comprises a roadwheel actuator that is configured to maintain a position of a rack in the ingress/egress mode.

8. A method for securing a position of a handwheel of a steer by wire steering system for a vehicle, the method comprising:
   determining, by an electronic controller of the steer by wire steering system, a transition of the steer by wire steering system to an ingress/egress mode corresponding to a time duration between a user opening a door of the vehicle and when the vehicle is ready to be driven or a time duration between the user shutting down a propulsion system of the vehicle and the user leaving the vehicle; and
   based on the determination that the steer by wire steering system is in the ingress/egress mode:
      computing a holding torque command based on a difference in a present angle of the handwheel and a target angle of the handwheel, which is caused by an input torque; and
      generating a holding torque corresponding to the holding torque command to secure the position of the handwheel.

9. The method of claim 8, wherein the transition to the ingress/egress mode is based on a signal indicative that a vehicle-engine is switched off.

10. The method of claim 8, wherein the transition out of the ingress/egress mode is based on a signal indicative that a vehicle-engine is switched on.

11. The method of claim 8, wherein, the holding torque is limited to a predetermined maximum amount.

12. The method of claim 8, further comprising, returning the handwheel to an original position at a constant velocity in case the handwheel moves to a different position because of the input torque.

13. The method of claim 8, wherein the holding torque command is computed based on a difference in a present angle of the handwheel and a target angle of the handwheel, which is caused by the input torque.

14. The method of claim 8, further comprising, maintaining, by a roadwheel actuator, a position of a rack in the ingress/egress mode.

15. A computer program product comprising a memory device having computer executable instructions stored therein, the computer executable instructions when executed by a processor causes the processor to perform a method for securing a position of a handwheel of a steer by wire steering system for a vehicle, the method comprising:
   determining, by an electronic controller of the steer by wire steering system, a transition of the steer by wire steering system to an ingress/egress mode corresponding to a time duration between a user opening a door of the vehicle and when the vehicle is ready to be driven or a time duration between the user shutting down a propulsion system of the vehicle and the user leaving the vehicle; and
   based on the determination that the steer by wire steering system is in the ingress/egress mode:
      computing a holding torque command based on a difference in a present angle of the handwheel and a target angle of the handwheel, which is caused by an input torque; and
      generating a holding torque corresponding to the holding torque command to secure the position of the handwheel.

16. The computer program product of claim 15, wherein the transition to the ingress/egress mode is based on a signal indicative that a vehicle-engine is switched off.

17. The computer program product of claim 15, wherein the transition out of the ingress/egress mode is based on a signal indicative that a vehicle-engine is switched on.

18. The computer program product of claim 15, wherein, the holding torque is limited to a predetermined maximum amount.

19. The computer program product of claim 15, further comprising, returning the handwheel to an original position at a constant velocity in case the handwheel moves to a different position because of the input torque.

20. The computer program product of claim 15, wherein the holding torque command is computed based on a difference in a present angle of the handwheel and a target angle of the handwheel, which is caused by the input torque.

* * * * *